(No Model.) 2 Sheets—Sheet 1.
T. GEMMELL.
AMALGAMATING APPARATUS.
No. 446,706. Patented Feb. 17, 1891.
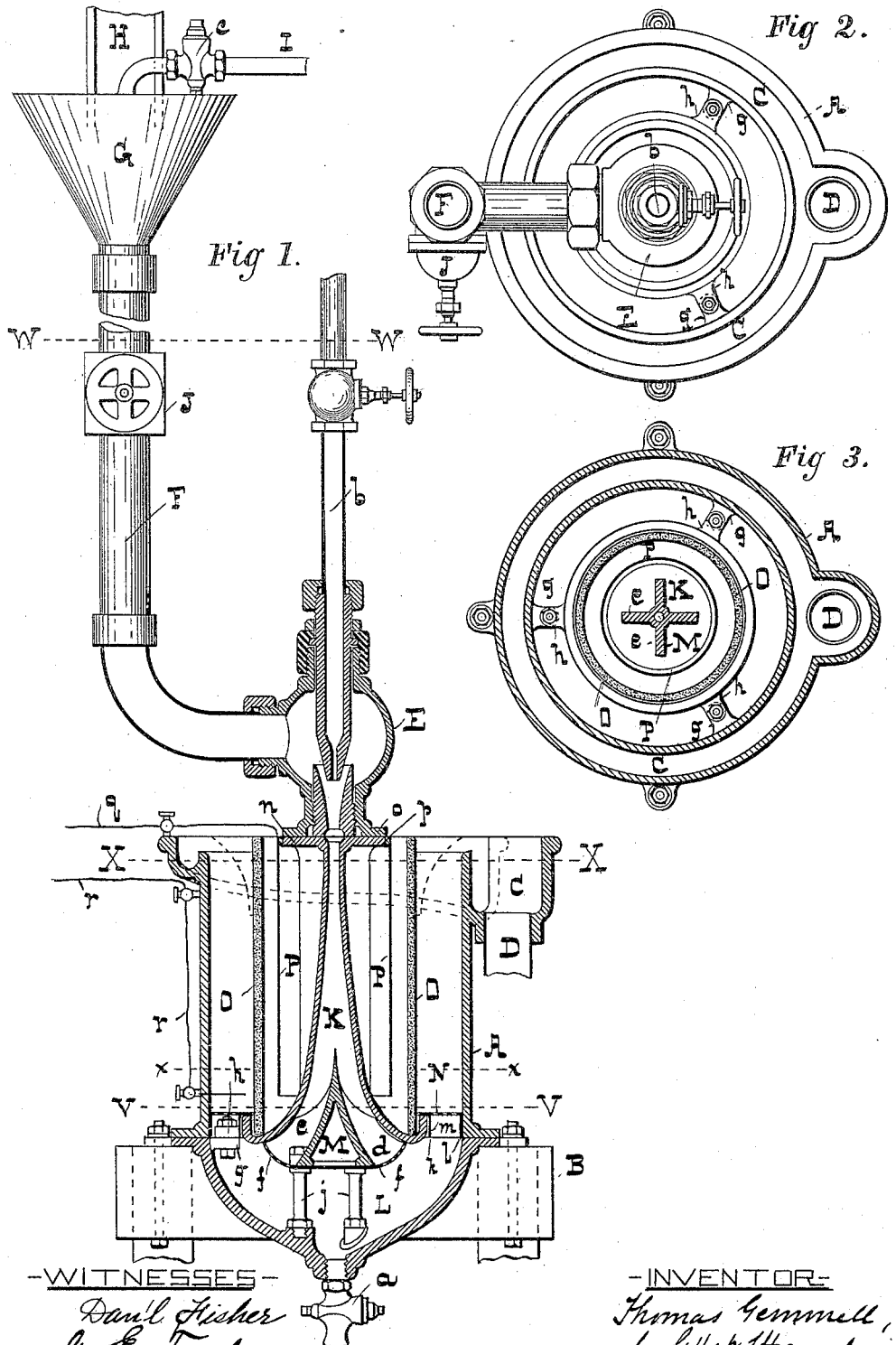
WITNESSES
Dan'l Fisher
Geo. E. Traylor
INVENTOR
Thomas Gemmell
by G. H. & W. T. Howard
Atty.
THE NORRIS PETERS CO., PHOTO-LITHO., WASHINGTON, D. C.

(No Model.) 2 Sheets—Sheet 2.
T. GEMMELL.
AMALGAMATING APPARATUS.
No. 446,706. Patented Feb. 17, 1891.
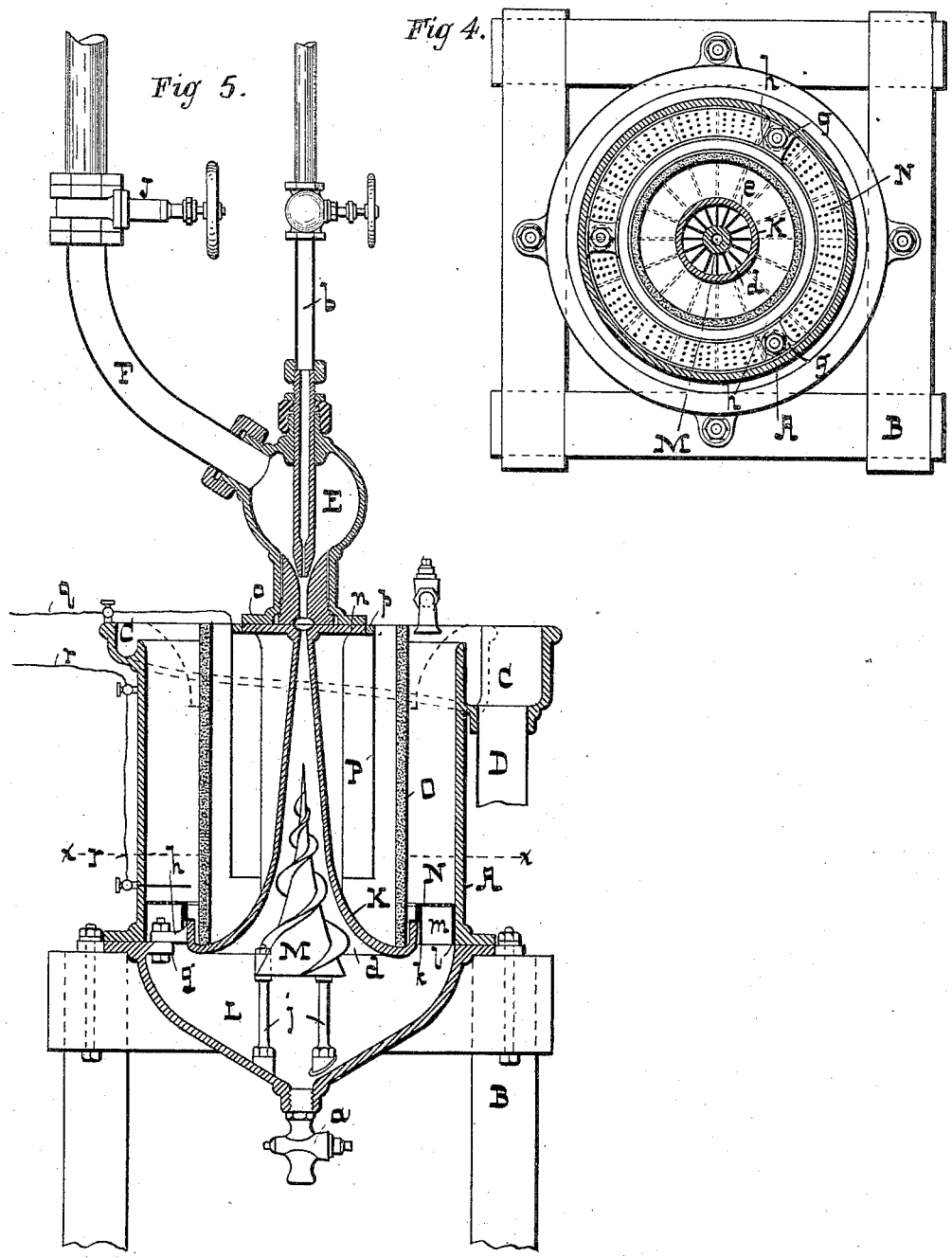
WITNESSES
Dan'l Fisher
Geo. E. Traylor
INVENTOR
Thomas Gemmell,
by G.H.&T.Howard,
Attys.

UNITED STATES PATENT OFFICE.

THOMAS GEMMELL, OF LONDON, ENGLAND.

AMALGAMATING APPARATUS.

SPECIFICATION forming part of Letters Patent No. 446,706, dated February 17, 1891.

Application filed December 12, 1889. Serial No. 333,468. (No model.)

*To all whom it may concern:*

Be it known that I, THOMAS GEMMELL, of 45 Gloucester Street, Warwick Square, S. W., London, England, have invented certain Improvements in Amalgamating Apparatus for the Treatment of Auriferous Ores, of which the following is a specification.

The object of this invention, in common with others of its class, is, first, to thoroughly intermingle finely-pulverized auriferous mineral with mercury under pressure, so that the particles of gold contained in the ore are brought in contact with mercury and amalgamated, and, secondly, to preserve the mercury in a pure, bright, and quick condition and prevent its fouling or sickening, in order that it may readily amalgamate with the metallic gold as it is brought in contact with it.

In the description of the said invention which follows reference is made to the accompanying drawings, forming a part hereof, and in which—

Figure 1 is an elevation of the improved amalgamator, the principal parts of which are shown in section. Fig. 2 is a sectional plan of Fig. 1 taken on the dotted line W W. Fig. 3 is a similar view of the same figure taken on the dotted line X X. Fig. 4 is another plan of the same figure on the dotted line V V. Fig. 5 is a central sectional elevation of the apparatus illustrating a modification in the construction of certain parts thereof, as hereinafter described.

Referring to Figs. 1 to 4, inclusive, A is a mercury-holding vessel or cistern, preferably, but not necessarily, of cylindrical shape with a spherical bottom. This vessel is made of iron, stoneware, or other material not affected by contact with its contained mercury, and provided with a cock or valve $a$ at its lowest point, through which the contents of the cistern may be drawn off.

The cistern A is supported by a suitable frame B. The top of the cistern is open, so that its fluid contents may overflow the edge to an exterior annular conduit C with an inclined bottom, the lowest part of which is provided with a discharge-pipe D.

E is an injector of any suitable type erected over and centrally of the cistern A, having its supply-pipe $b$ leading to a source of steam, water, or air under pressure. (Not shown.) The pipe which delivers the pulverized ore, either in a dry condition or mixed with water, to the injector, is denoted by F.

In Fig. 1 the supply-pipe F is shown as having a hopper G at its upper end, into which enters the launder H for pulverized ore, and a water-pipe I, having a controlling-cock $c$. The rapidity of movement of the ore and water through the delivery-pipe F is regulated by means of a gate J therein.

Connected to the injector E and projecting into the cistern A is a conical tube or pipe K with a flaring or trumpet mouth, the edge of which is preferably about on the line of junction between the cylindrical portion of the cistern and its spherical bottom, as shown in Fig. 1. This pipe serves to convey the ore and water under pressure to beneath the surface of a body of mercury L in the cistern A, and the object of the peculiar shape described is to effect a movement of the ore and water toward the circumference of the cistern. This movement is made more decided by the introduction into the flaring mouth of the pipe K of a core M of practically the same shape as the mouth, but smaller in diameter, so as to leave an annular space $d$ for the exit of the ore. The annular space $d$ is divided into a number of compartments by means of the radial plates $e$, which extend from the core and in alignment with its axis, and the ore issuing from each of these compartments is subdivided by means of a curved perforated plate $f$, bolted over the trumpet end of the conical pipe K.

By reference to Fig. 1 it will be seen that the conical pipe K is supported from the inner surface of the cistern A by means of lugs $g$ and $h$, the former projecting from the cistern and the latter from the conical pipe, and bolts which pass through both series. The core M rests on studs $j$, which rise from the bottom of the cistern.

N is a screen formed of a finely-perforated plate situated within the cistern A and standing on the edge of the flaring mouth of the conical pipe K, which is upwardly turned for the purpose. Beneath this annular screen N are two rings $k$ and $l$, connected by radial ribs $m$, which serve to divide the ore and water before their subdivision by means of the screen N. Within the screen and rising from the mouth of the pipe K to the top of the cistern is a cylindrical porous cell O, of unvitrified clay, cement, earthenware, or some other similar material, open at both ends; and within this porous cell is a cylinder P, of sheet-lead, carbon, or other substance of like electric character and properties, to serve as the positive electrode and element in a voltaic electric circuit constituting the anode. The anode is supported in a dependent position from the flange $n$ on the conical pipe K, which is bolted to a similar flange $o$ on the injector E. An insulating-ring $p$ is placed between the flange $n$ and the annular anode. The anode is connected by an insulated conducting-wire $q$ to and with the positive pole of an electric generator, (not shown,) but preferably a dynamo-machine. A corresponding conducting-wire $r$ communicates with and connects the mercury in the cistern with the negative pole of the electric generator.

The porous cell O is filled with an aqueous solution of sulphate of soda, dilute sulphuric acid, or similar material, to constitute an electrolyte, in which the anode is immersed.

While it is preferred to use an exterior electrical generator—such as a dynamo—it is evident that the apparatus could be operated as a self-contained and exciting voltaic battery; but the current under such circumstances would be limited, whereas with the dynamo it would not.

The cistern being charged with mercury to a height corresponding with the dotted line $x$ $x$, Fig. 1, and the porous cell supplied with an aqueous electrolyte, the operation of the apparatus is as follows: The auriferous mineral, finely pulverized, is fed into the receiving-chamber of the injector, either in a dry state or mixed with water, and the jet of steam, water, or air gradually turned on, the supply and pressure being regulated by the valves in the pipes. The injector forces the mineral and water into and through the conical pipe K to below the surface of the mercury in the cistern, the current being divided by means of the central core with its radial division-plates and the screens into numerous small streams, so that the particles, grains, or scales of gold are brought into close contact with the mercury under a pressure determined by the height of the column or head and amalgamated. The force of the current tends to expel the mercury from the interior of the conical pipe K, or to depress its surface within it, and the mercury consequently rises in the annular space between the side of the cistern and the porous cell. A removable flared top $a'$ (shown only in dotted lines) guides the tailings to the conduit C. As the ore and water pass from the trumpet-mouth of the conical pipe K, they rise, by reason of their specific gravity being less than that of the mercury, to the surface of that metal, passing through the annular screen N, which subdivides them again and into spray. The division and subdivision of the ore in its passage through the body of mercury has the effect of bringing every particle of gold into contact with it. The tailings overflow the edge of the cistern and enter the conduit C, from which they escape through the pipe D. The amalgam in the cistern is drawn off through the cock $a$ in its bottom. The mercury is maintained in a pure, bright, and quick condition and prevented from fouling or sickening in the presence of sulphurets, arsenic, antimony, or other deleterious elements in the auriferous mineral, so that it can readily amalgamate with the free metallic gold contained by means of the electro-chemical action of an electric current applied in the manner described. The mercury which constitutes the negative element or cathode in an electric circuit or battery is surcharged with hydrogen which is evolved by the aqueous electrolyte and transmitted through the porous cell and liberated at the cathode. Its presence and evolution prevent the oxidation of the mercury, and the passage of the electric current has a repelling effect to the combination of other minerals than gold with the mercury.

In Fig. 5 the conical pipe K is arranged as first described; but instead of the plates or wings on the core in the flaring end of the said pipe being in alignment with the axis of the core they are spiral in form. With this arrangement a rotary movement is imparted to the particles of ore and they are impelled by centrifugal force toward the outer edge or periphery of the delivery-pipe and forced separately through the mercury. The volute form of the wings or plates renders the employment of the perforated curved plate $f$ unnecessary, and it may be dispensed with.

In Fig. 6 the ore is intended to be fed to the apparatus dry and the water admitted directly to the surface of the mercury to carry off the tailings.

I claim as my invention—

In an amalgamator, a mercury-holding vessel, a pipe extending within the said vessel to near its bottom to convey ore from a point exterior of the vessel to a point below the contained mercury, the lower end of said pipe being flaring and upwardly turned, a porous cell supported by the upturned portion of said pipe, and an electrolyte and an anode in the porous cell, combined with an electric generator and wires leading from the opposite poles of the generator to the anode and the mercury, substantially as specified.

THOMAS GEMMELL.

Witnesses:
 WILLIAM OLIVER,
 WM. BARNETT,
*Clerks to Mess. Lowe, Gribble & Branton, No. 12 Abchurch Lane, London, Notaries Public.*